Patented June 19, 1945

2,378,377

UNITED STATES PATENT OFFICE 2,378,377

MASTIC TILE

Martin K. Bare, Lancaster, Pa., assignor to Armstrong Cork Company, Lancaster, Pa., a corporation of Pennsylvania No Drawing. Application January 9, 1941, Serial No. 373,807

16 Claims. (Cl. 260—26)

This invention relates to composition tile commonly designated by the term "mastic tile."

Polymers of coumarone, indene and related resins have been incorporated with plasticizers and fillers to produce mastic floor and wall tiling. As previously compounded, however, such tiling is not especially resistant to oils and greases. This particular disadvantage precludes the use of such tile in restaurants, garages, and filling stations. This lack of grease resistance has been recognized and has led to numerous attempts to remedy it. For example, as disclosed in United States Patent 2,145,648, issued to Charles E. Fawkes et al., the patentees overcome the disadvantage by substitution of the resin with cellulose ethers.

It has now been found that a mastic tile of improved oil and grease resistance can be produced from the coumarone, indene, styrene and related resins having a molecular weight of at least about 1,000 by compounding such resins with a soft resin of the alkyd type, such polymeric condensation products supplanting part of the plasticizer content that would normally be used with the hard resin. It has been found, however, that the improved oil and grease resistance is obtained by incorporating alkyd resins formed by the reaction of a polyhydric alcohol or their polyhydric ethers, such as glycerol, ethylene glycol, diethylene glycol, triethylene glycol, diglycerol, glycerol ethers, etc., with dibasic acids, such as phthalic acid, succinic acid, malonic acid, methyl succinic acid, sebacic acid, related aromatic and aliphatic dicarboxylic acids and their homologues, are used. The preferred alkyds, because of their optimum degree of softness and their present commercial availability and low cost, are the reaction products of the glycols and glycol ethers having at least three carbon atoms, especially with phthalic acid.

In the formulation of the composition tile, from 25% to 35% of binder composed of the hard resin, the soft alkyd, and plasticizers, is compounded with from about 65% to 75% of fillers, including inert inorganic pulverulent or fibrous materials and, if desired, pigments.

The hard resin constitutes the major portion of the binder, ranging from about 55% to 80% by weight thereof. This hard resin may be polymerized coumarone, indene or styrene, homologues thereof, or mixtures of these polymers. As stated above, the hard resin should have a molecular weight of at least about 1,000, the molecular weight being based upon viscosity measurements. The soft alkyd resin of the type described above constitutes from 10% to 25% of the binder and functions as a softening constituent of the tile, improving the toughness thereof, and, as stated above, improving the oil and grease resistance of the tile and at the same time maintaining good resistance to saponification by alkalies. This soft resin, though softening the binder, should not be considered to be a plasticizer because the hard resins have only limited compatibility with it. However, by virtue of its softness, it is possible to use much less plasticizer in this type of formulation than would be employed according to previous formulae. In addition to the hard resin and the soft alkyd, the binder contains from about 8% to 25% of a plasticizer, such as dibutyl phthalate, tricresyl phosphate, methyl abietate, hydrogenated methyl abietate, ethyl abietate, hydrogenated ethyl abietate, etc. Mineral oil up to 5% by weight of the binder may be added to aid in obtaining the limited compatibility necessary in the binder to limit the penetrability of the finished tile.

The fillers employed are preferably inert, inorganic pulverized materials, such as clay, or fibrous materials such as asbestos. Serpentine, talc, and whiting are additional examples of filling materials that are suitable. Pigments, such as titanium dioxide, ochre, carbon black, lead chromate, Prussian blue, etc., may be employed in any desired amount to impart color to the tile.

In compounding the tile, the several ingredients are added in any order to a jacketed dough-type mixer. Though not necessary, it is preferred to melt the alkyd before charging it into the mixer. Steam under 50 to 70 pounds per square inch gauge pressure is admitted into the jacket of the mixer and the mixing is carried on for 15 to 30 minutes. Thereupon, the mixer is given a short working upon heated masticating rolls. The mass coming from the masticating rolls is cut into blankets, folded, and passed through a cold calender almost to gauge, then cooled in a water bath, and sent through a second cold calender to exact gauge. If desired, the sheeted mass may be waxed or lacquered to improve the surface finish thereof. The sheeted composition is then passed on a belt through a cooling chamber and then cut to size.

The following representative examples in which the numbers refer to per cent by weight are illustrative of the invention:

| | Example No. | | | | | | | | |
|---|---|---|---|---|---|---|---|---|---|
| | 1 | 2 | 3 | 4 | 5 | 6 | 7 | 8 | 9 |
| Coumarone resin (mo. wt. 1150) | 19.8 | 19.2 | 21.0 | 21.0 | 18.0 | ---- | ---- | 18.6 | 19.5 |
| Polystyrene (mo. wt. 25,000 to 40,000) | ---- | ---- | ---- | ---- | 4.5 | 19.9 | ---- | ---- | ---- |
| Polyindene | ---- | ---- | ---- | ---- | ---- | ---- | 22.0 | ---- | ---- |
| Diethylene glycol phthalate | 4.8 | 7.1 | ---- | ---- | 4.5 | 4.5 | 5.3 | 6.0 | ---- |
| Triethylene glycol phthalate | ---- | ---- | 4.8 | ---- | ---- | ---- | ---- | ---- | ---- |
| Diethylene glycol succinate | ---- | ---- | ---- | 3.6 | ---- | ---- | ---- | ---- | ---- |
| Glycerol sebacate | ---- | ---- | ---- | ---- | ---- | ---- | ---- | ---- | 5.0 |
| Hydrogenated methyl abietate | 5.4 | 5.7 | 4.2 | 5.4 | ---- | ---- | ---- | 4.8 | 5.2 |
| Dibutyl phthalate | ---- | ---- | ---- | ---- | 3.0 | 5.6 | 7.7 | ---- | ---- |
| Mineral oil | ---- | ---- | ---- | ---- | ---- | ---- | ---- | 0.6 | ---- |
| Asbestos | 42.0 | 40.8 | 35.0 | 35.0 | 28.0 | 28.0 | 25.0 | 42.0 | 41.0 |
| Serpentine | 25.9 | 25.2 | 32.9 | 32.9 | 42.0 | 40.0 | 37.0 | 26.0 | 27.0 |
| Pigments | 2.0 | 2.0 | 2.1 | 2.1 | ---- | 2.0 | 3.0 | 2.0 | 2.3 |

The composition binder of the invention is of light color so that it is easily pigmented to any desired shade. Besides imparting the improved oil and grease resistance, the soft alkyd resin imparts a remarkable toughness so that the tile can be made of greater hardness without having the undesirable brittleness that necessarily accompanied any increase in hardness of this type of composition tile heretofore produced. This increased toughness obviously results in much less breakage in shipping and use. The greater hardness permits usage where greater loads will be applied than were previously permissible with this type of tile without the disadvantageous occurrence of excessive indentation of the tile. Besides having improved oil and grease resistance, the tiling of the invention retains good resistance to saponification by alkaline materials. The combination of these properties in the new tiling adapts it for use in many more establishments, such as in restaurants, gasoline stations, machine shops, garages, etc. than was heretofore possible with this type of composition tile.

While the invention has been disclosed in terms of specific examples employing certain materials in definitely stated proportions, the description is intended to be merely illustrative. It is obvious that various modifications may be made without departing from the spirit of the invention and it is to be understood that this invention is limited only by the appended claims.

I claim:

1. A preformed, composition tile comprising from about 65% to about 75% by weight of filler, and from about 35% to about 25% by weight of binder, said binder essentially consisting of from about 55% to about 80% by weight of a hard resin having a molecular weight of at least 1,000 selected from the group consisting of polymers of coumarone, indene, and styrene; from about 10% to about 25% by weight of an alkyd resin consisting of a polymeric condensation product of a polyhydric alcohol and an organic dicarboxylic acid; and from about 8% to about 25% by weight of a plasticizer for said hard resin and said condensation product.

2. A preformed, composition tile comprising filler and binder, said binder including from about 55% to about 80% by weight of a hard resin having a molecular weight of at least 1,000 selected from the group consisting of polymers of coumarone, indene, and styrene; from about 10% to about 25% by weight of an alkyl resin consisting of a polymeric condensation product of a polyhydric alcohol and an organic dicarboxylic acid; and from about 8% to about 25% by weight of a plasticizer for said hard resin and said condensation product.

3. A preformed, composition tile comprising from about 65% to about 75% by weight of filler, and from about 35% to about 25% by weight of binder, said binder including from about 55% to about 80% by weight of a hard resin having a molecular weight of at least 1,000 selected from the group consisting of polymers of coumarone, indene, and styrene; from about 10% to about 25% by weight of an alkyd resin consisting of a polymeric condensation product of a glycol with an organic dicarboxylic acid; and from about 8% to about 25% by weight of a plasticizer.

4. A preformed, composition tile comprising filler and binder, said binder including from about 55% to about 80% by weight of a hard resin having a molecular weight of at least 1,000 selected from the group consisting of polymers of coumarone, indene, and styrene; from about 10% to about 25% by weight of an alkyd resin consisting of a polymeric condensation product of a glycol with an organic dicarboxylic acid; and from about 8% to about 25% by weight of a plasticizer.

5. A preformed, composition tile comprising from about 65% to about 75% by weight of a filler, and from about 35% to about 25% by weight of binder, said binder including from about 55% to about 80% by weight of a hard resin having a molecular weight of at least 1,000 selected from the group consisting of polymers of coumarone, indene, and styrene; from about 10% to about 25% by weight of an alkyd resin consisting of a polymeric condensation product of a glycol with an organic dicarboxylic acid; and from about 8% to about 25% by weight of a plasticizer, said plasticizer including a mineral oil in an amount not greater than 5% by weight of said binder.

6. A preformed, composition tile comprising filler and binder, said binder including from about 55% to about 80% by weight of a hard resin having a molecular weight of at least 1,000 selected from the group consisting of polymers of coumarone, indene, and styrene; from about 10% to about 25% by weight of an alkyd resin consisting of a polymeric condensation product of a glycol with an organic dicarboxylic acid; and from about 8% to about 25% by weight of a plasticizer, said plasticizer including a mineral oil in an amount not greater than 5% by weight of said binder.

7. A preformed, composition tile comprising filler and binder, said binder including from about 55% to about 80% by weight of a hard resin having a molecular weight of at least about 1,000 selected from the group consisting of polymers, coumarone, indene, and styrene; from about 10% to about 25% by weight of diethylene glycol phthalate resin; from about 8% to about 25% by weight of a plasticizer.

8. A preformed, composition tile comprising filler and binder, said binder including from about 55% to about 80% by weight of a hard resin having a molecular weight of at least about 1,000 selected from the group consisting of polymers of coumarone, indene, and styrene; from about 10% to about 25% by weight of triethylene glycol phthalate resin; from about 8% to about 25% by weight of a plasticizer.

9. A preformed, composition tile comprising filler and binder, said binder including from about 55% to about 80% by weight of a hard coumarone resin having a molecular weight of at least about 1,000; from about 10% to about 25% by weight of an alkyd resin consisting of a polymeric condensation product of a glycol with an organic dicarboxylic acid; and from about 8% to about 25% by weight of a plasticizer.

10. A preformed, composition tile comprising filler and binder, said binder including from about 55% to about 80% by weight of a hard polystyrene resin having a molecular weight of at least about 1,000; from about 10% to about 25% by weight of an alkyd resin consisting of a polymeric condensation product of a glycol with an organic dicarboxylic acid; and from about 8% to about 25% by weight of a plasticizer.

11. A preformed, composition tile comprising from about 65% to about 75% by weight of filler, and from about 35% to about 25% by weight of binder, said binder comprising a hard coumarone resin having a molecular weight of at least about 1,000, from about 10% to about 25% by weight of diethylene glycol phthalate resin; and from about 8% to about 25% by weight of a plasticizer.

12. A preformed, composition tile comprising from about 65% to about 75% by weight of filler, and from about 35% to about 25% by weight of binder, said binder comprising from about 55% to about 80% by weight of a hard coumarone resin having a molecular weight of at least about 1,000; from about 10% to about 25% by weight of triethylene glycol phthalate resin; and from about 8% to about 25% by weight of a plasticizer.

13. A preformed, composition tile comprising from about 65% to about 75% by weight of filler, and from about 35% to about 25% by weight of binder, said binder including from about 55% to about 80% by weight of a hard coumarone resin having a molecular weight of at least about 1,000; from about 10% to about 25% by weight of diethylene glycol phthalate resin; and from about 8% to about 25% by weight of hydrogenated methyl abietate.

14. A preformed, composition tile comprising from about 65% to about 75% by weight of filler, and from about 35% to about 25% by weight of binder, said binder including from about 55% to about 80% by weight of a hard polystyrene resin having a molecular weight of at least about 1,000; from about 10% to about 25% by weight of triethylene glycol phthalate resin; and from about 8% to about 25% by weight of hydrogenated methyl abietate.

15. A preformed, composition tile comprising from about 65% to about 75% by weight of filler, and from about 35% to about 25% by weight of binder, said binder including from about 55% to about 80% by weight of a hard polystyrene resin having a molecular weight of at least about 1,000; from about 10% to about 25% by weight of diethylene glycol phthalate resin; and from about 8% to about 25% by weight of a plasticizer.

16. A preformed, composition tile comprising from about 65% to about 75% by weight of filler, and from about 35% to about 25% by weight of binder, said binder including from about 55% to about 80% by weight of a hard polystyrene resin having a molecular weight of at least about 1,000; from about 10% to about 25% by weight of diethylene glycol phthalate resin; and from about 8% to about 25% by weight of dibutyl phthalate.

MARTIN K. BARE.

CERTIFICATE OF CORRECTION.

Patent No. 2,378,377. June 19, 1945.

MARTIN K. BARE.

It is hereby certified that error appears in the printed specification of the above numbered patent requiring correction as follows: Page 2, first column, line 75, claim 2, for "alkyl" read --alkyd--; and that the said Letters Patent should be read with this correction therein that the same may conform to the record of the case in the Patent Office.

Signed and sealed this 18th day of September, A. D. 1945.

Leslie Frazer (Seal) First Assistant Commissioner of Patents.

filler and binder, said binder including from about 55% to about 80% by weight of a hard coumarone resin having a molecular weight of at least about 1,000; from about 10% to about 25% by weight of an alkyd resin consisting of a polymeric condensation product of a glycol with an organic dicarboxylic acid; and from about 8% to about 25% by weight of a plasticizer.

10. A preformed, composition tile comprising filler and binder, said binder including from about 55% to about 80% by weight of a hard polystyrene resin having a molecular weight of at least about 1,000; from about 10% to about 25% by weight of an alkyd resin consisting of a polymeric condensation product of a glycol with an organic dicarboxylic acid; and from about 8% to about 25% by weight of a plasticizer.

11. A preformed, composition tile comprising from about 65% to about 75% by weight of filler, and from about 35% to about 25% by weight of binder, said binder comprising a hard coumarone resin having a molecular weight of at least about 1,000, from about 10% to about 25% by weight of diethylene glycol phthalate resin; and from about 8% to about 25% by weight of a plasticizer.

12. A preformed, composition tile comprising from about 65% to about 75% by weight of filler, and from about 35% to about 25% by weight of binder, said binder comprising from about 55% to about 80% by weight of a hard coumarone resin having a molecular weight of at least about 1,000; from about 10% to about 25% by weight of triethylene glycol phthalate resin; and from about 8% to about 25% by weight of a plasticizer.

13. A preformed, composition tile comprising from about 65% to about 75% by weight of filler, and from about 35% to about 25% by weight of binder, said binder including from about 55% to about 80% by weight of a hard coumarone resin having a molecular weight of at least about 1,000; from about 10% to about 25% by weight of diethylene glycol phthalate resin; and from about 8% to about 25% by weight of hydrogenated methyl abietate.

14. A preformed, composition tile comprising from about 65% to about 75% by weight of filler, and from about 35% to about 25% by weight of binder, said binder including from about 55% to about 80% by weight of a hard polystyrene resin having a molecular weight of at least about 1,000; from about 10% to about 25% by weight of triethylene glycol phthalate resin; and from about 8% to about 25% by weight of hydrogenated methyl abietate.

15. A preformed, composition tile comprising from about 65% to about 75% by weight of filler, and from about 35% to about 25% by weight of binder, said binder including from about 55% to about 80% by weight of a hard polystyrene resin having a molecular weight of at least about 1,000; from about 10% to about 25% by weight of diethylene glycol phthalate resin; and from about 8% to about 25% by weight of a plasticizer.

16. A preformed, composition tile comprising from about 65% to about 75% by weight of filler, and from about 35% to about 25% by weight of binder, said binder including from about 55% to about 80% by weight of a hard polystyrene resin having a molecular weight of at least about 1,000; from about 10% to about 25% by weight of diethylene glycol phthalate resin; and from about 8% to about 25% by weight of dibutyl phthalate.

MARTIN K. BARE.

CERTIFICATE OF CORRECTION.

Patent No. 2,378,377. June 19, 1945.

MARTIN K. BARE.

It is hereby certified that error appears in the printed specification of the above numbered patent requiring correction as follows: Page 2, first column, line 75, claim 2, for "alkyl" read --alkyd--; and that the said Letters Patent should be read with this correction therein that the same may conform to the record of the case in the Patent Office.

Signed and sealed this 18th day of September, A. D. 1945.

Leslie Frazer (Seal) First Assistant Commissioner of Patents.